United States Patent [19]
Finger

[11] 3,742,388
[45] June 26, 1973

[54] COULOMETER CONTROLLED METHOD AND APPARATUS FOR GENERATING AN ELECTRICAL FUNCTION

[75] Inventor: Eugene P. Finger, Brewster, N.Y.

[73] Assignee: Curtis Instruments, Inc., Mount Kisco, N.Y.

[22] Filed: July 13, 1971

[21] Appl. No.: 162,147

[52] U.S. Cl............... 332/2, 324/94, 328/141, 332/56
[51] Int. Cl............................................. H03c 1/46
[58] Field of Search ............... 332/2, 31 T, 31 R, 332/56; 328/141–145; 324/94

[56] References Cited
UNITED STATES PATENTS

| | | | |
|---|---|---|---|
| 2,961,610 | 11/1960 | Hosenthien | 328/142 X |
| 3,255,413 | 6/1966 | Marwell et al. | 324/94 |
| 3,462,684 | 8/1969 | Beusman | 324/94 |
| 3,622,914 | 11/1971 | Chung | 332/56 |

Primary Examiner—Alfred L. Brody
Attorney—Dean S. Edmonds, Frank F. Scheck and John L. Sigalos et al.

[57] ABSTRACT

A method and apparatus for generating an electrical function utilizing a coulometer integrator which modulates an AC signal in accordance with the integral of a variable DC input current. The modulated signal is amplified and demodulated by a detector and fed to a utilization device. Both the AC signal source and the variable DC current source may be controlled by the same or separate control signals, thereby generating a signal having the form of the integral of a function multiplied by either the same function or by a different function.

9 Claims, 9 Drawing Figures

Patented June 26, 1973
3,742,388
2 Sheets-Sheet 1
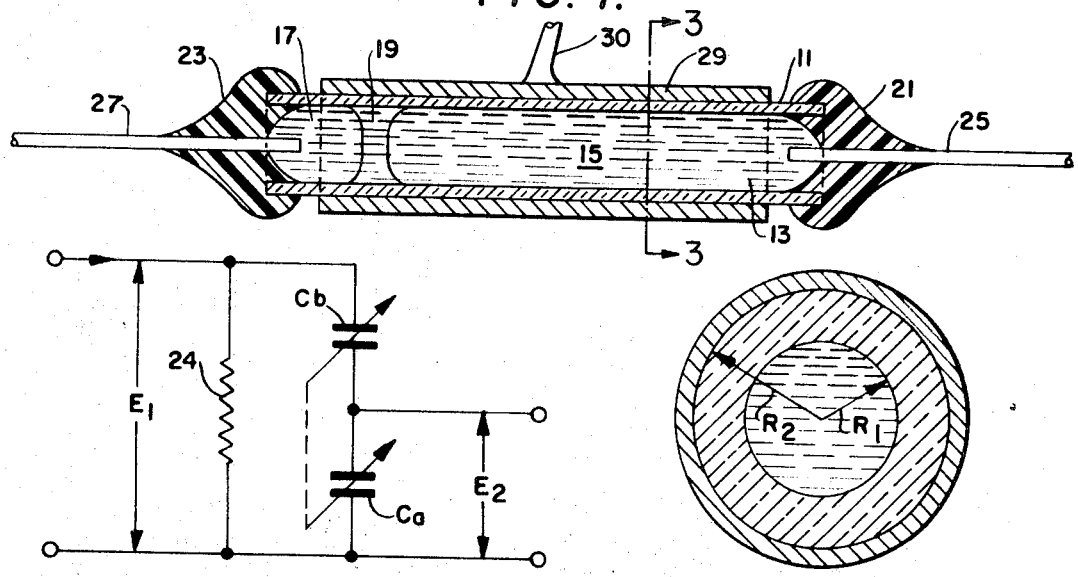
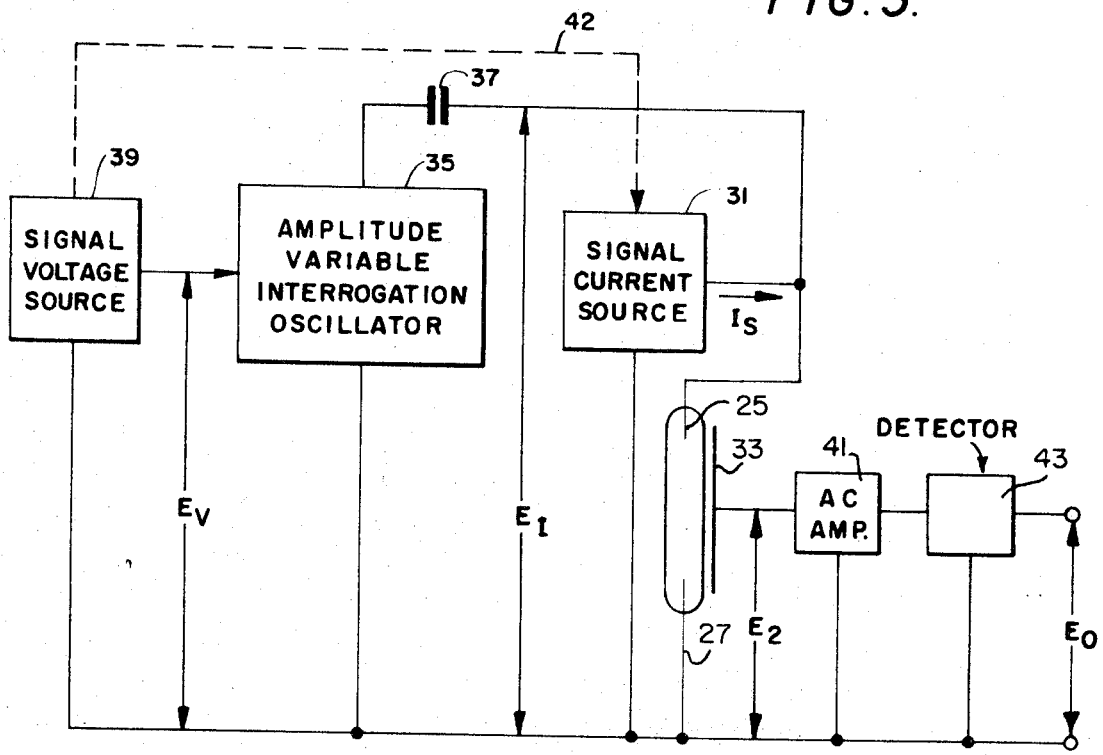
INVENTOR
EUGENE P. FINGER
BY
Pennie, Edmonds, Morton, Taylor & Adams
ATTORNEYS

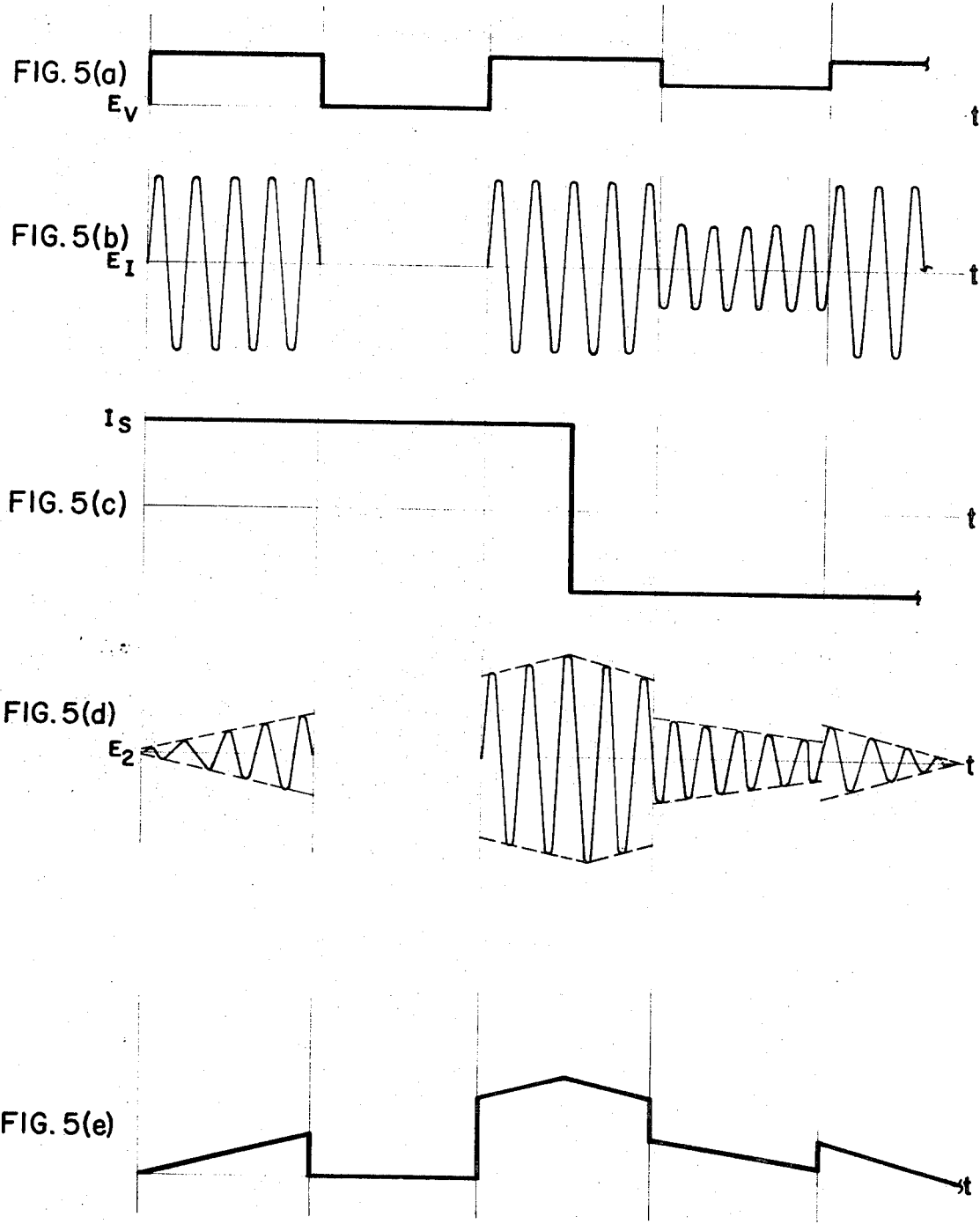

COULOMETER CONTROLLED METHOD AND APPARATUS FOR GENERATING AN ELECTRICAL FUNCTION

BACKGROUND OF THE INVENTION

This invention relates to a method and apparatus for generating an electrical function and, more specifically, to a function generator and method therefor utilizing a coulometer which has an output that varies with the integral of a signal with respect to time.

In computer and other applications, there is often a need for generated signals that follow a prescribed function. Thus, for example, it is often required that a first signal be squared or multiplied by another or that a signal be generated that is proportional to the integral of another signal. Function generators presently used for such purposes require complex, expensive circuitry and often are characterized as lacking in flexibility. Thus, many present day generators can multiply or integrate and multiply only a selected waveform over a relatively narrow range of frequencies. Such generators are not well-suited for use in varying applications and, accordingly, have been designed on an ad hoc basis.

It, therefore, is an object of this invention to provide an economical yet flexible method and means for generating an electrical function.

SHORT STATEMENT OF THE INVENTION

Accordingly, this invention relates to a method and apparatus for generating an electrical function utilizing a means, such as, for example, a coulometer for modulating an AC signal in accordance with the integral of a variable DC input current. The modulated signal is amplified and demodulated by a detector and fed to a utilization device. Both the AC signal source and the variable DC current source may be controlled by the same or separate control signals, thereby generating a signal having the form of the integral of a first function multiplied by a second function or having the form of a function multiplied by its integral.

BRIEF DESCRIPTION OF THE DRAWINGS

Other objects, features and advantages of this invention will become more fully apparent from the following detailed description, appended claims and the following drawings in which:

FIG. 1 shows a simplified section view of a coulometer.

FIG. 2 shows an equivalent circuit configuration of the coulometer of FIG. 1.

FIG. 3 shows an enlarged cross-sectional view of the coulometer of FIG. 1 taken along the line 3—3.

FIG. 4 shows a schematic diagram of the preferred embodiment of the invention.

FIG. 5(a) is a graphical display of the output of the signal voltage source of this invention.

FIG. 5(b) is a graphical display of the output of the interrogation oscillator of this invention.

FIG. 5(c) is a graphical display of the output of the signal current source of this invention.

FIG. 5(d) is a graphical display of the output of the coulometer of this invention.

FIG. 5(e) is a graphical display of the output of the function generator of this invention.

DETAILED DESCRIPTION

FIG. 1 shows a simplified section view of a coulometer such as utilized in the preferred embodiment of the present invention and which is illustrated in U.S. Pat. No. 3,255,413 issued to E. M. Marwell et al. A tube 11 comprised of non-conductive material such as glass, ceramics, epoxy resin or the like, has a capillary bore 13 into which is placed a pair of liquid metal columns 15 and 17. The columns which may be comprised of mercury, for example, extend inwardly from the opposite ends of the tube and are separated at their innermost ends by a small volume of an electrolyte 19 which is maintained in conductive contact with both columns. A suitable electrolyte may be a water solution of potassium iodide and mercuric iodide.

The bore 13 is sealed at both ends by epoxy resin seals 21 and 23 as illustrated. Electrical contact with the respective metal columns is provided by conductive leads 25 and 27, the innermost ends of which are immersed in the mercury columns. The conductive leads are preferably made of a metal, such as, for example, nickel which does not chemically combine with the mercury in the bore.

A conductive sheath 29 is secured to the outer surface of tube 11 along substantially the full length thereof and an electrically conductive lead 30 is attached thereto for permitting conduction of electrical signals with respect to the sheath 29. Conductive epoxy resin has been found to be a satisfactory sheath material, but it should be understood that any suitable electrical conductor disposed around the exterior surface of the body may be used as an alternative.

Refer now to FIG. 2 which shows a schematic diagram of the equivalent circuit of the coulometer illustrated in FIG. 1. The capacitance between mercury column 15 and sheath 29 is represented by a capacitor $C_a$ and the capacitance between column 17 and sheath 29 is represented by a capacitor $C_b$. As the capacitance of $C_a$ increases, the capacitance of $C_b$ decreases, and, as capacitance $C_a$ decreases, the capacitance of $C_b$ increases correspondingly. Thus, the capacitors are in a ganged differential form which is represented by the dotted line in the figure. Additionally, the coulometer has a small resistance provided mainly by the electrolyte 19. This resistance is represented by resistor 24 which is connected in parallel across the capacitors $C_a$ and $C_b$. It should be recognized that the coulometer instrument illustrated in FIG. 1 electrically functions as a capacitive potentiometer which when electrically energized with an AC voltage divides the voltage as a linear function of the value of the output capacitor $C_a$.

The transfer characteristic of the coulometer, that is, $E_2$ relative to the input current $I_s$ will now be developed. The displacement of the gap formed by the electrolyte 19 with respect to either end of the tube 11 is linearly related to the number of coulombs passing through the coulometer from lead 25 to lead 27. More specifically, a variable current $I_s$ maintained for a period of time T transfers $m$ grams of material, i.e., the liquid metal, having a molecular weight $W$ and valence $\alpha$ through the electrolyte 19 in accordance with Faraday's Law. This may be represented by the following mathematical formulation:

$$m = \frac{W}{\alpha F} \int_0^T I_s \, dt \qquad (1)$$

where $F$ equals 96,494 coulombs. If, for example, liquid mercury having a density $\rho$ is transferred in the capillary bore 11 which has a diameter $d$, the gap displacement L, i.e., the length of a mercury column, can be computed as follows:

(volume of mercury in a column) $= m/\rho = \frac{1}{4}\pi d^2 L$ (2)

This may be transposed so that $$L = 4m/\rho\pi d^2 \quad (3)$$

and, therefore, by substituting equation (3) into equation (1) the following formula is derived:

$$L = \frac{4W}{\rho\pi\alpha d^2 F}\int_0^T I_s dt = K_1 \int_0^T I_s dt \quad (4)$$

Where $K_1$ is a constant. It thus can be seen that the gap displacement L from either end of the tube 11 of the coulometer is proportional to the integral of the current passing through the coulometer.

Refer now to FIG. 3 which shows a cross sectional view of the coulometer of FIG. 1 taken along the line 3—3 thereof. The tube 11 is shown separating a conductive sheath 29 from the bore 13 which contains a liquid metal, such as, mercury. The bore 13 is shown having a radius $R_1$ and the conductive sheath is shown having a radius $R_2$. The capacitance between the conductive sheath 29 and the mercury in the bore 13 may be represented by the following well-known formula:

$$C = (0.241\ E_r L/\log R_2/R_1)\ Pf = K_2 L\ Pf \quad (5)$$

where the gap displacement, i.e., the length of the mercury column, is $L$ and $E_r$ is the relative capacitivity of the tube 11. It can be seen that the capacitance between the mercury column of the coulometer and the conductive sheath 29 is directly proportional to the displacement of the gap with respect to one of the ends of the coulometer. Accordingly, the capacitance between the mercury column and the outer sheath is proportional to a constant times the integral of the current passing through the coulometer. This may be represented as follows:

$$C = K_3 \int_0^T I_s dt \quad (6)$$

The output transfer function of the coulometer integrator can now be developed. With reference to FIG. 2, the following formula represents the output transfer function:

$$E_2 = [(1/SC_a)/(1/SC_a) + (1/SC_b)]\ E_1 = C_b/(C_a + C_b)\ E_1 \quad (7)$$

Where $S$ is the LaPlace operator. Since the total capacitance is always constant for a given coulometer, equation (7) may be simplified to $$E = (C_b/C_t)\ E_1 \quad (8)$$

where $C_t$ is the total capacitance and is a constant. Thus, combining the above equation with equation (6) the output $E_2$ can be represented by $$E_2 = E_1 K_4 \int_0^T I_s dt \quad (9)$$

It thus can be seen that the output $E_2$ of the coulometer is directly proportional to the integral with respect to time of the current passing through the coulometer multiplied by the voltage across the coulometer.

Refer now to FIG. 4 which is the preferred embodiment of the function generator of this invention. A signal current source 31 having a substantially infinite output impedance is connected across the input leads 25 and 27 of a coulometer 33. Accordingly, current source 31 appears as a constant current source to the coulometer and slight variations in electrolyte resistance with interchange of coulometers has no affect on the generator's accuracy. A relatively high frequency AC signal (e.g. 80KHz) is fed to the coulometer from an amplitude variable interrogation oscillator 35 through a DC blocking capacitor 37. The output impedance of interrogation oscillator 35 is very small and, preferably, should approach zero ohms so that the oscillator appears as a constant voltage source. Blocking capacitor 37 prevents the current $I_s$ generated by current source 31 from feeding into the interrogation oscillator output. The blocking capacitor should have a high value in order to minimize the impedance presented by the capacitor to the AC output of the interrogation oscillator.

A signal voltage source 39 is shown connected to the interrogation oscillator 35 for controlling the amplitude of the oscillator output signal. Thus, the voltage $E_1$ at the output of oscillator 35 is proportional to the voltage output $E_v$ of the signal voltage source 39.

The current from source 31 causes the output capacitance of the coulometer 33 to vary in accordance with the integral thereof as mathematically described by equation (6). The high frequency signal from the interrogation oscillator 35 is, therefore, modulated in accordance with the changing value of the output capacitance and consequently in accordance with the integral of the current from source 31. The output of the coulometer is, therefore, an amplitude modulated signal which may be represented by the following formula:

$$E_2 = E_v K_5 \int_0^T I_s dt \quad (10)$$

This signal is amplified by an AC amplifier 39 having a substantially infinite input impedance and is then detected by an envelope detector 43. Envelope detector 43 operates in the same manner as a typical amplitude modulated signal receiver, namely, by rectifying the output from amplifier 41 and filtering the high frequency components of the rectified signal in a low pass filter, thereby, providing an output corresponding to the envelope of the signal from the coulometer.

An alternate embodiment of the invention is represented by the dotted line 42 of FIG. 4 wherein the signal voltage source 39 also controls the signal current source 31. Thus, the current output from source 31 is proportional to the voltage output $E_v$ of source 39. The resultant signal at the output of the detector may be expressed mathematically as follows:

$$E_0 = E_v K_6 \int_0^T E_v dt \tag{11}$$

Thus, the output is proportional to the integral with respect to time of a function ($E_v$) times that function ($E_v$).

Refer now to FIG. 5 which shows the waveforms associated with the circuit of circuit 4 when utilized as described in the first embodiment. FIG. 5($a$) shows the output from the signal voltage source 39, which is shown as a modified square wave. It should be understood, however, that any waveform configuration may be utilized in the present invention and that the modified square wave illustrated in FIG. 5($a$) is utilized for explanatory purposes only. The modified square wave from the signal voltage source 39 is fed to the amplitude variable interrogation oscillator 35 which generates an output signal which is proportional to the signal shown in FIG. 5($a$). Thus, the output of the interrogation oscillator is an amplitude modulated AC wave having an envelope corresponding to $E_v$. FIG. 5($c$) shows the output from current source 31 which, as shown here, has a constant amplitude but which periodically reverses direction of flow. It is understood, of course, that the output of source 31 can be of any waveshape desired for a given application. The current from signal current source 31 and the signal from interrogation oscillator 35 are each fed to the coulometer 33 where the current $I_s$ causes the output capacitance of the coulometer to change, as aforementioned, in accordance with the integral of the current. The output of the coulometer, accordingly, will be proportional to the integral with respect to time of the current $I_s$ times the voltage $E_1$. This output is shown in FIG. 5 ($d$). As can be seen, the voltage initially increases in both the positive and negative directions linearly with respect to time since the input current from source 31 is initially constant. However, when the current from source 31 reverses direction, i.e., goes negative, the output voltage of the coulometer decreases linearly with respect to time. If the current from source 31 was sinusoidal, for example, the envelope of the output of the coulometer would be sinusoidal in shape with a 90° phase shift with respect to the input current. The coulometer output is amplified and detected in amplitude demodulator 43. The demodulated output from detector 43 is illustrated in FIG. 5($e$) and corresponds to the envelope of the coulometer output $E_2$. It should be understood, of course, that other waveforms $E_v$ and $I_s$ could be applied to generate different functions.

While the invention has been particularly shown and described with reference to a preferred embodiment, it will be understood by those skilled in the art that various changes in form and detail may be made without departing from the spirit and scope of the invention as defined by the appended claims.

I claim:

1. A function generator comprising:
    a signal voltage source,
    a variable amplitude oscillator having an input and output,
    means for controlling the amplitude of the output of said oscillator in accordance with said signal voltage,
    means for generating a current,
    means for modulating the output of said oscillator in accordance with the integral of said current, and
    means for demodulating said modulated signal to give a signal having an amplitude that is proportional to the amplitude of the output of said oscillator multiplied by the integral of said current with respect to time.

2. The generator of claim 1 wherein said means for modulating the output of said oscillator in accordance with the integral of said current comprises a variable capacitance coulometer.

3. The generator of claim 2 wherein said variable capacitance coulometer comprises:
    a body of non-conductive material having a bore,
    two columns of liquid metal positioned in said bore,
    an electrolyte separating the innermost ends of said columns and being in electrical contact therewith,
    a conductive sheath about the outer surface of said body, said conductive sheath and said liquid metal columns forming a differential variable capacitance, and
    means for electrically connecting said current generating means and said oscillator to said liquid metal columns, said metal from one of said columns being deposited on the other of said columns when said current is conducted through the columns of said coulometer, the change of capacitance between said columns and said sheath being indicative of the integral of the current conducted through the coulometer with respect to time.

4. The function generator of claim 1 further comprising means for varying the amplitude of said current.

5. The function generator of claim 4 wherein said means for varying the amplitude of said current is said means for controlling the amplitude of the output of said oscillator, the demodulated output of said function generator being proportional to the amplitude of said output of voltage of said means for varying the amplitude of said current multiplied by the integral of said current with respect to time.

6. The function generator of claim 5 wherein said means for modulating the output of said oscillator in accordance with the time integral of said current is a variable capacitance coulometer.

7. A method of generating an electrical function having an amplitude that is proportional to the amplitude of a first signal multiplied by the integral of a second signal comprising the steps of
    generating an AC signal having a controllable amplitude,
    controlling the amplitude of said AC signal,
    generating a second signal,
    modulating said AC signal in accordance with the integral of said second signal, and
    demodulating said modulated signal to give a signal having an amplitude that is proportional to said AC signal multiplied by the time integral of said second signal.

8. The method of claim 7 wherein said modulating step further comprises
    conducting said AC signal and said second signal through the liquid metal columns of a coulometer,
    varying the output capacitance of said coulometer in accordance with the time integral of said second signal, and
    detecting said AC signal across said output capacitance of said coulometer.

9. The method of claim 8 further comprising the step of controlling the amplitude of said second signal.

* * * * *